3,629,341
PRODUCTION OF EPOXIDIZED ALKOXY ALKA-
DIENES AND OF ALKANETRIOLS, PARTICU-
LARLY 1,2,4-BUTANETRIOL
Adin L. Stautzenberger and Charles C. Hobbs, Jr., Corpus
 Christi, Tex., assignors to Celanese Corporation, New
 York, N.Y.
No Drawing. Filed Aug. 15, 1968, Ser. No. 752,745
Int. Cl. C07c *31/18, 77/02*
U.S. Cl. 260—635 A                              1 Claim

ABSTRACT OF THE DISCLOSURE 1,2,4-butanetriol, which is useful in manufacturing explosives, is produced by reacting a 1-alkoxy-1,3-butadiene, particularly 1-methoxy-1,3-butadiene, with an organic peroxide such as peracetic acid to form the monoepoxide derivative, which is then hydrolyzed to form 3,4-dihydroxybutyraldehyde which is then hydrogenated to form 1,2,4-butanetriol. In its broader aspects the invention embraces the conversion of any $\alpha,\beta$-internally unsaturated aldehydoalkene to a 1-alkoxy-1,3-alkadiene by reacting the aldehydoalkene with an alkanol and pyrolyzing the resulting product to form the 1-alkoxy-1,3-alkadiene which may then be epoxidized and, if desired, converted to the corresponding alkanetriol.

---

This invention relates to the production of 1,2,4-butanetriol. It also relates to the preparation of intermediate compounds used in the production of 1,2,4-butanetriol, e.g. certain epoxidized 1-alkoxy-1,3-butadienes, as well as higher alkadiene homologs thereof.

1,2,4-butanetriol is a compound which is very important in the production of explosives. The trinitrate of 1,2,4-butanetriol has properties as an explosive which are on a par with those of nitroglycerin. In addition, 1,2,4-butanetriol may be used in the production of polyurethane and alkyd resins.

It is an object of this invention to provide a novel process for the production of 1,2,4-butanetriol.

It is another object of this invention to provide novel processes for the production of intermediate compounds used in the production of 1,2,4-butanetriol.

It is a further object of this invention to provide novel compositions used in the production of 1,2,4-butanetriol.

Other objects of this invention will become obvious from the specification and claims in which all proportions are by weight unless otherwise stated.

In accordance with one aspect of this invention, 1,2,4-butanetriol is prepared from 1-methoxy-1,3-butadiene by epoxidizing the 1-methoxy-1,3-butadiene, hydrolyzing the epoxidized product and hydrogenating the resulting hydrolysate.

The 1-methoxy-1,3-butadiene is epoxidized, preferably with an organic peroxide or peracid, most preferably peracetic acid. Other organic peroxides or peracids such as perbenzoic acid or the like are applicable to this invention. Preferably 1 mole of the peroxide is added for every mole of the 1-methoxybutadiene. Where peracetic acid is used, it has been found advantageous to supply the peracetic acid as a solution preferably in a solvent such as acetic acid, methyl acetate, acetone, methylal, chloroform, or carbon tetrachloride. The reaction between 1-methoxy-1,3-butadiene and peracetic acid is very rapid and exothermic. It is preferable to add the peracetic acid slowly and at such a rate that the temperature of the reaction is maintained at from about 25 to 100° C. preferably 30 to 35° C. If desired, an external coolant, e.g., an ice bath, may be used to maintain the temperature within the desired limits. The reaction time is preferably from 5 to 120 minutes.

Reaction with peracetic acid forms a monoepoxide which may or may not be solvolyzed, e.g. to the hydroxyacetate form. If desired, the formation of appreciable amounts of hydroxyacetate can be substantially reduced by utilizing a non-acidic inert solvent. However, the formation of hydroxyacetate derivatives is not particularly detrimental to this synthesis.

Where peracetic acid is used, the epoxidation product is distilled after the reaction to remove the acetic acid formed as well as to remove the solvent in which the peracetic acid was supplied, if any. The residue, comprising the epoxidized 1-methoxy-1,3-butadiene, is then hydrolyzed. Hydrolysis may be advantageously accomplished by dissolving the residue in water, about from 1 to 10 parts of water preferably being used for each part of residue, and then heating the solution. The solution preferably has a pH of from about 1 to 2. Usually sufficient acetic acid is still present to give this acidity. Hydrolysis is generally carried out at about 60 to 100° C., preferably less than about 80° C. Time for hydrolysis may be about 5 to 120 minutes. While the methanol formed during hydrolysis may be removed from the reaction mixture by distillation or other techniques, it is usually permissible to allow the methanol hydrolysis product to remain in the reaction mixture since it does not appear to be detrimental to further processing.

The hydrolysate, comprising 3,4-dihydroxybutyraldehyde, is then hydrogenated to produce 1,2,4-butanetriol. It is preferable to hydrogenate by treating the 3,4-dihydroxybutyraldehyde with hydrogen gas, in the presence of any commonly-used hydrogenation catalyst. The temperatures at which this hydrogenation is carried out are somewhat dependent upon the catalyst selected. With active catalyst it has been found to be advisable to maintain the temperature less than about 100° C., and preferably above 20° C. Temperatures of 25 to 60 or 80° C. have been determined to work very well. Preferably, this hydrogenation is conducted under pressures above atmospheric, most preferably at pressures of from about 100 to 500 p.s.i.g., optimally in the lower portion of this range. Higher pressures can be employed, there being no upper limit, but very high pressures are not necessary. The catalyst may suitably be Raney nickel, Raney cobalt, platinum or palladium but is preferably copper-chromic oxide (i.e. copper promoted with chromic oxide) on silica gel. It is generally preferred to hydrogenate as soon after hydrolysis as practicable in order to minimize possible by-product formation.

It has been found that there is a tendency for the 3,4-dihydroxy-butyraldehyde to undergo aldol-type condensation where an alkaline catalyst such as Raney nickel is used. It is therefore more desirable to use non-alkaline hydrogenation catalysts, such as the copper-chromium catalysts on silica gel referred to above. The copper oxide-chromium oxide mixture known as copper chromite is also suitable. Hydrogenation is suitably accomplished in a rocking autoclave with a hydrogen atmosphere. It is within the scope of this invention to carry out the hydrogenation in other manners, e.g., bubbling hydrogen through the hydrolysate. Hydrogenation generally takes about 10 to 120 minutes, preferably from 30 to 60 minutes.

After hydrogenation, the water and any remaining solvents are removed by distillation, suitably at about atmospheric pressure but preferably under subatmospheric pressures, most preferably at 15 to 20 mm. HgA, and temperatures preferably up to about 50 to 60° C. The residue product comprises 1,2,4-butanetriol.

The 1,2,4-butanetriol may be conveniently separated from impurities, such as aldols, in the residue product by ordinary distillation techniques. In some cases, it may be desirable to co-distill the residue with hexadecane, preferably about 10 to 20 parts of hexadecane being used for every one part or residue. The butanetriol product is recovered as a fraction taken at about 100 to 120° C. at pressures of about 30 mm. HgA. It is within the scope of this invention to utilize other separation operations, e.g., extraction, to recover the 1,2,4-butanetriol product.

The following example will serve to illustrate the practice of this invention.

EXAMPLE

To one mole of 1-methoxy-1,3-butadiene there was added gradually with continuous stirring, over a period of 2 hours, one mole of peracetic acid as a 3.68 molar solution of peracetic acid in acetic acid. The reaction is exothermic and the temperature was maintained between 30 and 35° C. by controlling the rate of addition of the peracetic acid and through the use of an ice bath. The reaction was substantially complete upon complete addition of the peracetic acid. The reaction product was then distilled at a temperature of 30° C. and a pressure of 20 mm. HgA to remove acetic acid overhead. The residue was then dissolved in water and the solution was refluxed at atmospheric pressure for one hour, after which the solution was neutralized to a pH of 6.5 with sodium bicarbonate. A catalyst consisting of a Raney nickel-water slurry in a proportion of 10% of the hydrolysate was added to the product. The mixture was then heated to 115° C. in a pressure vessel and hydrogen gas introduced into the vessel at a pressure of 1000 p.s.i.g. The hydrogenation reaction was continued for one hour after which the mixture was heated to a temperature of 20° C. at a pressure of 17 mm. HgA for 30 minutes to remove water. The residue was then heated at a temperature of 60° C. at a pressure of 2 mm. HgA for 10 minutes to remove low boilers and trace amounts of water. Hexadecane was then added to the residue, 10 parts of hexadecane being added for each part of residue. The mixture was co-distilled from 40 to 110° C. at 30 mm. HgA. The product polyols, including 1,2,4-butanetriol, separated as a lower phase in the distillate.

In another aspect of this invention, 1-methoxy-1,3-butadiene is prepared by the reaction of crotonaldehyde with methanol. This reaction is suitably carried out in the liquid phase at about 25 to 30° C. at about atmospheric pressure in the presence of an acid catalyst, e.g., sulfuric acid, p-toluenesulfonic acid or the like, to form 1,1,3-trimethoxybutane. This acetal is then pyrolyzed in the vapor phase over barium hydroxide on silica gel to 1-methoxy-1,3-butadiene. The reaction is generic to alkanols and alpha, beta-unsaturated aldehydo-alkenes having at least 4 carbon atoms in the chain (as exemplified by crotonaldehyde). The reaction of crotonaldehyde and methanol has been given by way of example only. This reaction is quite important since it provides a technique whereby internal, olefinic unsaturation alpha to a carbonyl group can be in effect moved one position. For example, methanol can be reacted with 2-hexenal, in the presence of an acidic catalyst as described above, to form 1,1,3-trimethoxyhexane. Upon pyrolyzing this intermediate in the same manner as the pyrolysis of the 1,1,3-trimethoxybutane described above, the resulting pyrolysis product is 1-methoxy-1,3-hexadiene. To summarize, an $\alpha,\beta$ internally unsaturated aldehyde, especially an aldehydoalkene, is reacted with an alcohol, especially an alkanol, to form the 1,1,3-trialkoxyalkane derivative. This, upon pyrolysis, forms the corresponding 1-alkoxy-1,3-alkadiene.

It is to be understood that the foregoing detailed description is given merely by way of illustration and that many variations may be made therein without departing from the spirit of our invention.

Having described our invention what we desire to secure by Letters Patent is:

1. Process for the production of 1,2,4-butanetriol which comprises
   (1) monoepoxidizing 1-methoxy-1,3-butadiene with an organic peroxide at a temperature ranging from 25 to 100° C.,
   (2) hydrolyzing the mono-epoxide product of (1) at a pH of 1 to 2 with water at about 60° to 100° C. to obtain 3,4-dihydroxybutyraldehyde, and
   (3) hydrogenating 3,4-dihydroxybutyraldehyde in the presence of a hydrogenation catalyst selected from the group consisting of Raney nickel, Raney cobalt, platinum, palladium, and copper-chromic oxide on silica gel at a temperature ranging from 20 to about 100° C. and a pressure ranging from 100 to 500 p.s.i.g.

References Cited

UNITED STATES PATENTS

| 2,236,919 | 4/1941 | Reynhart | 260—635 E |
| 2,657,242 | 10/1953 | Siggia | 260—635 A |
| 2,833,787 | 5/1958 | Carlson et al. | 260—635 E |
| 2,887,498 | 5/1959 | Hearne et al. | 260—635 A |
| 2,947,761 | 8/1960 | Payne | 260—635 E |
| 2,982,787 | 5/1961 | Hoaghin et al. | 260—611 |
| 3,001,975 | 9/1961 | Pearers et al. | 260—348.5 L |

FOREIGN PATENTS

| 724,012 | 2/1955 | Great Britain | 260—615 |
| 823,180 | 11/1959 | Great Britain | 260—348.5 L |
| 843,696 | 7/1952 | Germany | 260—615 |

LEON ZITVER, Primary Examiner

J. E. EVANS, Assistant Examiner

U.S. Cl. X.R.

203—68, 77; 260—348.5 L, 496, 602, 614 R, 615 A